Aug. 21, 1962 L. A. TATE 3,050,639

SINGLE SHOT MULTIVIBRATOR WITH PULSE WIDTH CONTROL

Filed Oct. 30, 1958 2 Sheets-Sheet 1

INVENTOR
LAWRENCE A. TATE

BY Archer S. Tenser

ATTORNEY

Aug. 21, 1962 L. A. TATE 3,050,639

SINGLE SHOT MULTIVIBRATOR WITH PULSE WIDTH CONTROL

Filed Oct. 30, 1958 2 Sheets-Sheet 2

United States Patent Office 3,050,639
Patented Aug. 21, 1962

3,050,639

SINGLE SHOT MULTIVIBRATOR WITH PULSE WIDTH CONTROL

Lawrence A. Tate, Poughkeepsie, N.Y., assignor to International Business Machines Corporation, New York, N.Y., a corporation of New York Filed Oct. 30, 1958, Ser. No. 770,848
13 Claims. (Cl. 307—88.5)

This invention relates to pulse generators, and more particularly to single shot multivibrator circuits utilizing transistors.

Conventional pulse generators of the multivibrator type employ cross-coupling between the inputs and outputs of the respective tubes or transistors for effecting the necessary switching therebetween. The networks which make up this cross-coupling generally employ resistance-capacitance circuits whose time constants control the dimensions of the output pulses. Since the rise and fall times of such circuits are dependent on supply voltages as well as the circuit parameters, variations in either may result in changes in pulse dimension that may be objectionable in circuits where accuracy is of extreme importance. In high speed digital computers, for example, small changes in pulse widths can be particularly undesirable.

Accordingly, it is an object of this invention to provide a novel pulse generator which produces a rectangular output pulse of accurately controlled width.

Another object of this invention is to provide a novel circuit for producing a pulse of predetermined duration in response to a keying pulse.

It is another object of this invention to provide a novel circuit employing transistors for producing pulses of accurately controlled width.

Still another object of this invention is to provide a novel single shot multivibrator circuit which, although not limited thereto, is particularly suitable for use in electronic computers.

More specifically, the novel circuit of this invention comprises a pair of signal translating devices, such as transistors, one of which is normally in a heavily conducting state and the other normally in a state of low conductivity. In one embodiment, the latter device is substantially non-conducting in its low conductivity state while in another embodiment, it is conducting a relatively small amount of current while in its low conductivity state. These devices are so interconnected that the latter is switched to a heavily conductive state upon cessation of current in the normally heavily conductive device. This change of state is effected through excitation of a resonant circuit which is coupled to the control element of the normally heavily conducting translating device. Prior to receipt of a keying pulse, direct current is supplied to the resonant circuit through an additional normally conducting translating device. The keying pulse biases this device into non-conduction, abruptly cutting off the current supply to the resonant circuit and exciting it into oscillation. The alternating potential then at a selected point in the resonant circuit by virtue of the energy transfer between the capacitive and inductive elements occurring during oscillation, is applied to the normally heavily conducting one of the pair of translating devices. Polarities and directions of current flow are so chosen that the potential at the selected point during the first half cycle of oscillation is of the proper polarity to bias this device off, enabling the normally not conducting (or relatively lightly conducting) translating device to conduct heavily. When the resonant circuit voltage swings to the opposite polarity, the first translating device is returned to its highly conductive state, the second device resumes its state of low conductivity, and the circuit is restored to its quiescent condition. A damping circuit connected across the resonant circuit absorbs the oscillatory energy substantially at the end of the first half cycle. The output pulse which may be taken for example, from the load circuit of the normally off or lightly conducting translating device, is thus equal in duration to one half period of the natural frequency of oscillation of the resonant circuit. By varying the resonant frequency of the circuit, different pulse widths may be achieved.

Another feature of the invention is a latching circuit which enables the generator to complete a normal cycle of operation independently of the duration of the keying signal. This latch essentially is a feedback loop from the normally off or lightly conducting unit of the translating device pair to the device suppling current to the resonant circuit. The feedback holds the current supply off for the full half cycle even if the keying input is removed.

As will be seen hereinafter, two embodiments of the invention are shown, both of which operate on the same principle and incorporate the same basic elements. One of these embodiments utilizes current switching techniques, particularly suitable for use in conjunction with certain types of electronic computer logical circuitry, although not limited to such use. The other embodiment is designed for use with voltage responsive networks and similarly, although clearly suitable for general application, is particularly useful in certain forms of computer circuitry.

Other objects and features of the invention will be pointed out in the following description and claims and illustrated in the accompanying drawings, which disclose by way of example, the principle of the invention and the best modes, which have been contemplated, of applying that principle.

FIG. 1

Figure 1:
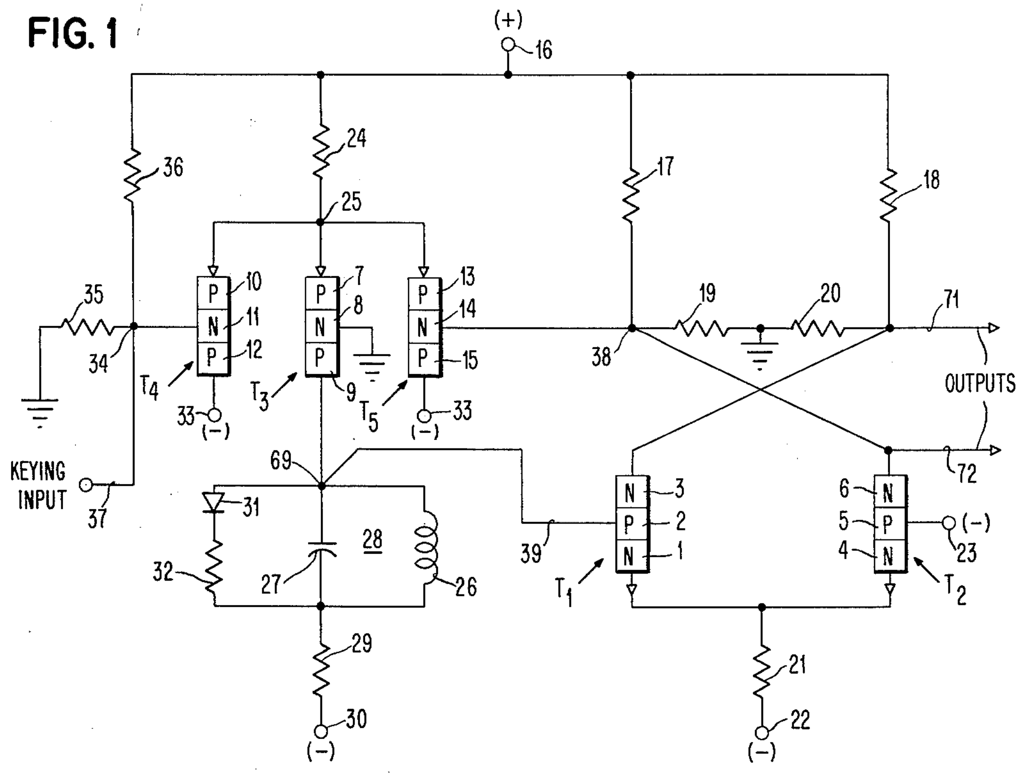
FIG. 1 is a schematic diagram of an embodiment of the invention useful in current responsive applications.

Referring now to the drawings, FIG. 1 illustrates a preferred embodiment of the invention utilizing current switching techniques. Transistors $T_1$ and $T_2$ are of the NPN junction type, each having an emitter, a collector, and a base. $T_3$, $T_4$ and $T_5$ similarly are junction transistors each having an emitter, a collector and a base, but are of the opposite conductivity or PNP type. All these transistors may be standard, commercially available types.

Collectors 3 and 6 of transistors $T_1$ and $T_2$ are connected to a suitable positive D.C. voltage supply 16 through resistors 17 and 18 respectively. Resistor 19 is connected between collector 6 and reference potential and resistor 20 is connected between collector 3 and reference potential. The network consisting of resistors 17, 18, 19 and 20 comprises a voltage divider providing proper collector potentials for $T_1$ and $T_2$. Emitters 1 and 4 of $T_1$ and $T_2$ respectively, are connected in common and through a resistor 21 to negative potential source 22. These latter two elements form a constant current generator of the proper polarity for the conductivity type of transistors $T_1$ and $T_2$. Base 5 of $T_2$ is returned to the negative terminal of a source of potential 23, and as will be more fully discussed hereinafter, base 2 of transistor $T_1$ is coupled by lead 39 to point 69 on the resonant circuit forming part of the invention.

Potential source 16 in series with resistor 24 comprises a constant current generator supplying current to point 25, to which are also connected the emitters 7, 10 and 13 of transistors $T_3$, $T_4$ and $T_5$ respectively. Collector 9 of transistor $T_3$ is connected to point 69 at one junction of the parallel combination of inductance 26 and capacitance 27, which forms a resonant or oscillatory circuit 28. The other junction of inductance 26 and capacitance 27 is returned through resistor 29 to the negative terminal of potential source 30. Diode 31, which may be of any well known type, in series with resistor 32, provides a damping circuit connected across resonant circuit 28. Diode 31 is connected to be biased in the forward direction when the potential at point 69 is more positive than that at the connection of resistor 29 to the resonant circuit. The base 8 of transistor $T_3$ is directly connected to reference potential.

Collector 12 of transistor $T_4$ is directly coupled to a suitable source of negative potential 33. Resistors 35 and 36, connected in series between source 16 and reference potential, form a voltage divider network for applying suitable biasing potential from their common point 34 to base 11. Also connected to point 34 is a lead 37 to which the input keying pulses are applied.

The collector 15 of transistor $T_5$ is also connected to negative supply source 33 and its base 14 is directly connected to the junction 38 of resistors 17 and 19. Outputs are taken from leads 71 and 72 which are coupled to the collectors of transistors $T_1$ and $T_2$ respectively.

OPERATION OF FIG. 1

In the quiescent state, prior to receipt of a keying pulse, the constant current source comprising voltage supply 16 and resistance 24 is supplying current to point 25. Resistors 35 and 36 are so proportioned that the potential at junction 34 is such as to maintain transistor $T_4$ non-conducting. Similarly, the voltage divider action of resistors 17 and 19 maintains a potential at point 38 of such value as to keep transistor $T_5$ cut off. Transistor $T_3$ is conducting, however, and current flow is maintained therethrough by virtue of the potential drop across the emitter-base junction which renders emitter 7 positive with respect to the base 8. Current, therefore, flows in the circuit comprising transistor $T_3$, resonant circuit 28, diode 31, resistor 32, resistor 29 and source 30. The resultant current flow through inductor 26 stores energy therein according to the relationship:

$$W \text{ (energy)} = \tfrac{1}{2}LI^2$$

The potential at resonant circuit 28, is applied from point 69 over lead 39 to the base 2 of $T_1$. It is to be understood that point 69 may alternatively be located at some intermediate tap on inductor 26. During conduction of $T_3$, the potential at point 69 is just slightly more positive than source 30, resistor 29 being made small. This potential however, is sufficiently positive with respect to the potential at the emitter 1 to maintain $T_1$ in a highly conducting state. Conduction through $T_1$ renders the emitter 4 of $T_2$ sufficiently positive with respect to its base 5 to keep it cut off. Thus in this embodiment, transistor $T_2$ is non-conducting while in its low conductivity state.

Under quiescent conditions then, $T_1$ and $T_3$ are conducting, charging current is being supplied to resonant circuit 28 to supply energy thereto, and $T_2$, $T_4$ and $T_5$ are biased to non-conduction. The relative voltages present at various portions of the circuit are shown to the left of the "$t_0$" line in the curves of FIG. 2.

Figure 2:
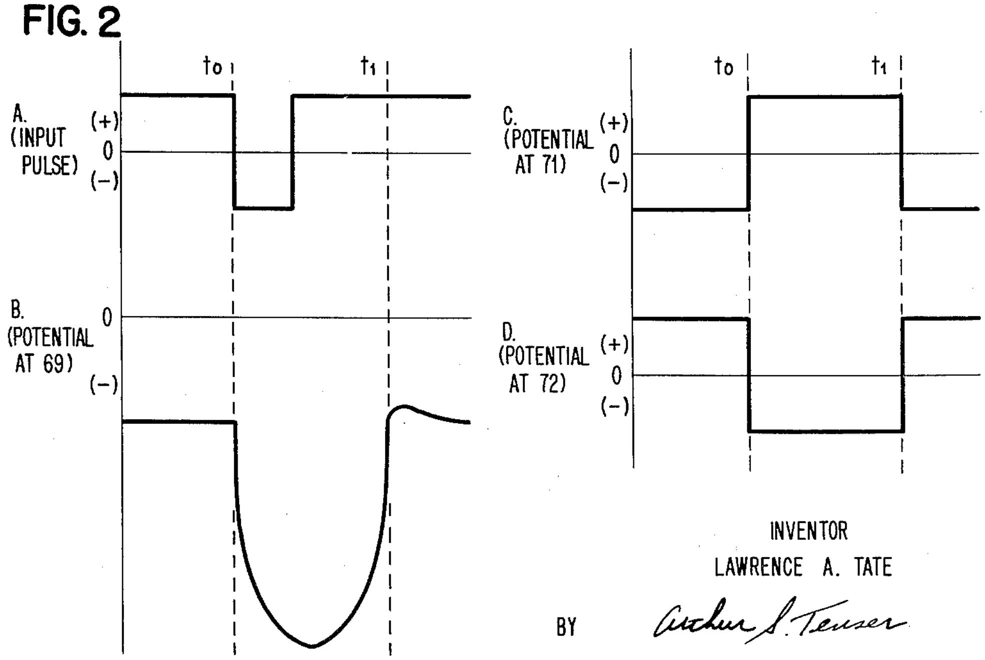
FIG. 2 is a series of waveforms to aid in explaining the operation of the circuit of FIG. 1.

Receipt of a keying pulse on line 37, such as of the shape shown in curve A of FIG. 2, lowers the bias on base 11 of $T_4$ and renders it conducting. The surge of current through $T_4$ lowers the potential at point 25 and makes it sufficiently negative with respect to the reference potential to cause $T_3$ to cease conducting. Current from source 24, 16 is now switched to $T_4$.

At the instant $T_3$ ceases conducting, the potential at point 69 drops to that of source 30 and inductor 26, which had been storing energy, begins to discharge into capacitor 27. This results in storage of energy in capacitor 27 according to the relationship; $W$ (energy) $=\tfrac{1}{2}CV^2$. This transference of energy from inductance 26 to capacitance 27 is accompanied by a drop in potential at point 69. When this negative voltage swing reaches its peak value $$\left(V=I\sqrt{\frac{L}{C}},\ \text{neglecting losses in the circuit}\right)$$

the current in the resonant circuit reverses itself and the capacitor discharges its energy back into the inductance, resulting in a rise in potential at point 69. This process, it will be recognized, is the familiar energy transference that takes place during oscillation of a parallel resonant circuit. Abrupt cessation of current through $T_3$ therefore, excites or shocks resonant circuit 28 into oscillation and the resultant voltage variation at any point in the circuit 28 will be sinusoidal.

The drop in potential at point 69 which occurs at the commencement of oscillation is coupled via lead 39 to the base 2 of normally conducting transistor $T_1$. Since the rate of decrease of potential at point 69 is at a maximum at the instant that oscillation begins, $T_1$ is cut off substantially simultaneously therewith. This rate is increased by choosing values of L and C for the resonant circuit such that the voltage excursions during oscillation are large. Cessation of current through $T_1$ causes a slight drop in potential at the upper end of resistor 21, enabling $T_2$ to begin to conduct. Once conducting, current flow in $T_2$ is maintained by the voltage drop across its base-emitter junction.

Conduction through $T_2$ lowers the potential at its collector 6. This potential drop is coupled at 38 to the base of transistor $T_5$, rendering this transistor conductive, causing current flow to switch to $T_5$ from transistor $T_4$. Therefore, $T_5$ is maintained in a conducting state as long as $T_2$ remains conducting and thus $T_3$ remains held off for the same period. As can be seen, this has the effect of making the output pulse width independent of the keying pulse duration.

As the potential at point 69 starts to swing positive with respect to its value when the circuit is in a quiescent state, $T_1$ is again rendered conductive, which returns $T_2$ to its low conductivity state. This, in turn, biases $T_5$ to non-conduction and permits current flow through $T_3$, returning the circuit to its quiescent condition.

Oscillation of resonant circuit 28 is damped out substantially at the end of one half cycle by diode 31, which starts to conduct as the potential at point 69 swings positive with respect to its quiescent value. Damping resistor 32 is chosen to make the dissipation factor equal to or greater than unity and in practice, may comprise only the resistance of the diode.

In FIG. 2, a series of curves are shown which illustrate the waveforms present at various points in the circuit of FIG. 1. Curve A represents the keying or input pulse which is applied via lead 37 at time $t_0$. The potential at point 69 is shown in curve B. As can be seen, this potential, which is applied to $T_1$, is damped out substantially at the end of one half cycle of oscillation of resonant circuit 28 ($T_1$). $T_1$ is thus maintained non-conducting for a half cycle. As shown, the keying pulse width (curve A) may be substantially less than that of the output pulse; the latch action of $T_5$ maintaining $T_3$ non-conducting for the full half cycle.

The pulse outputs of the circuit are shown in curves C and D. The positive going pulse of curve C is available at lead 71 while the negative going pulse of curve D appears on lead 72.

FIG. 3

Figure 3:
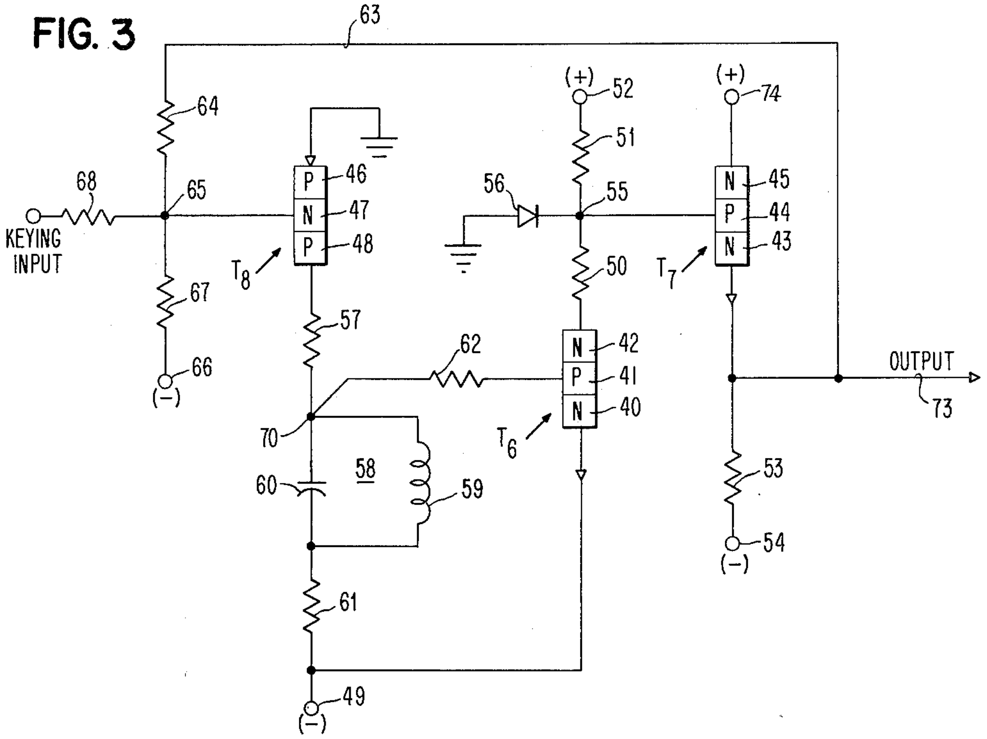
FIG. 3 is a schematic diagram of an embodiment of the invention useful in voltage responsive applications.

In FIG. 3 is shown another embodiment of the invention utilizing voltage responsive circuitry, as opposed to the current switching technique utilized in the circuit of FIG. 1. However, the basic organization and principle of operation remains the same.

Transistors $T_6$ and $T_7$ are of the NPN junction type each having an emitter, a base and a collector. $T_8$ is a junction transistor of the NPN type, also having emitter, base and collector.

Emitter 40 of transistor $T_6$ is connected directly to a source of negative potential 49. Collector 42 is connected through the series combination of resistors 50 and 51 to positive potential source 52. Collector 45 of $T_7$ is coupled directly to a positive voltage supply 74 with its emitter 43 connected through resistor 53 to negative voltage supply 54. Base 44 is directly connected to the junction 55 of resistors 50 and 51 to which is also coupled one terminal of clamping diode 56. The other terminal of diode 56 is tied to reference potential.

Transistor $T_8$ has its emitter 46 connected directly to reference potential and its collector 48 coupled through resistor 57 to point 70 at one junction of the parallel combination of inductance 59 and capacitance 60 which form resonant circuit 58. The other junction of inductance 59 and capacitance 60 is connected through biasing resistor 61 to negative voltage source 49. Resistor 62 couples point 70 to the base 41 of $T_6$.

The output 73 of the circuit is taken from the emitter of $T_7$. Conductor 63 and resistor 64 provide a feedback path from this output to junction point 65, which in turn, is directly connected to base 47 of $T_8$. Negative voltage source 66 is coupled through resistor 67 to junction 65, to which is also connected one end of resistor 68. The other terminal of resistor 68 provides an input connection for keying pulses.

OPERATION OF FIG. 3

Prior to receipt of a keying pulse, source 66 maintains a negative bias on the base 47 of $T_8$ sufficient to render it conducting. Current flows through resistor 57, resonant circuit 58, and resistor 61, storing energy in inductance 59 in the manner described in connection with the resonant circuit 28 of FIG. 1. The potential applied from point 70 via resistor 62 to base 41 of $T_6$ is sufficiently positive with respect to emitter 40 to render this transistor conducting. As noted with respect to its counterpart 69 in the circuit of FIG. 1, point 70 may alternatively be located at an intermediate tap on inductance 59.

Transistor $T_7$ is connected in an emitter follower configuration with resistor 53 being the load impedance. The potential at point 55 is applied to base 44 of $T_7$ and with $T_6$ conducting is sufficiently positive with respect to emitter 43 to maintain $T_7$ conducting at a relatively small value of current. The current level in this low conductivity state of $T_7$ establishes at the output line a quiescent voltage value.

A positive keying pulse applied to resistor 68 raises the potential on base 47 sufficiently to cut the transistor $T_8$ off. As discussed with respect to the equivalent portions of the circuit of FIG. 1, the sudden cessation of current excites resonant circuit 58 into oscillation. As inductance 59 begins to discharge into capacitance 60, the potential at point 70 swings in a negative direction, cutting off transistor $T_6$. Cessation of current through $T_6$ raises the potential at point 55 and $T_7$ commences to conduct heavily, sharply raising the voltage level at the output line. This voltage rise is coupled back to base 47 of $T_8$ via conductor 63 and resistor 64 to maintain $T_8$ non-conducting after cessation of the keying pulse, thus effecting the latching action.

As the voltage at point 70 swings positive with respect to its quiescent value, $T_6$ is again rendered conductive, lowering the potential at point 55 and returning $T_7$ to its low conductivity quiescent condition. This in turn removes the blocking or latching bias fed back to hold off $T_8$ and this transistor resumes conduction, returning the entire circuit to its quiescent state. Circulating currents in resonant circuit 58 are damped out in the circuit comprising resistor 62 and the diode formed by the base 41 and emitter 40 of $T_6$. Diode 56 is connected in a forward direction between reference potential and point 55 and serves to clamp the potential at base 44 of $T_7$ at a minimum of reference potential. This establishes the output voltage substantially at reference level under quiescent conditions.

Figure 4:
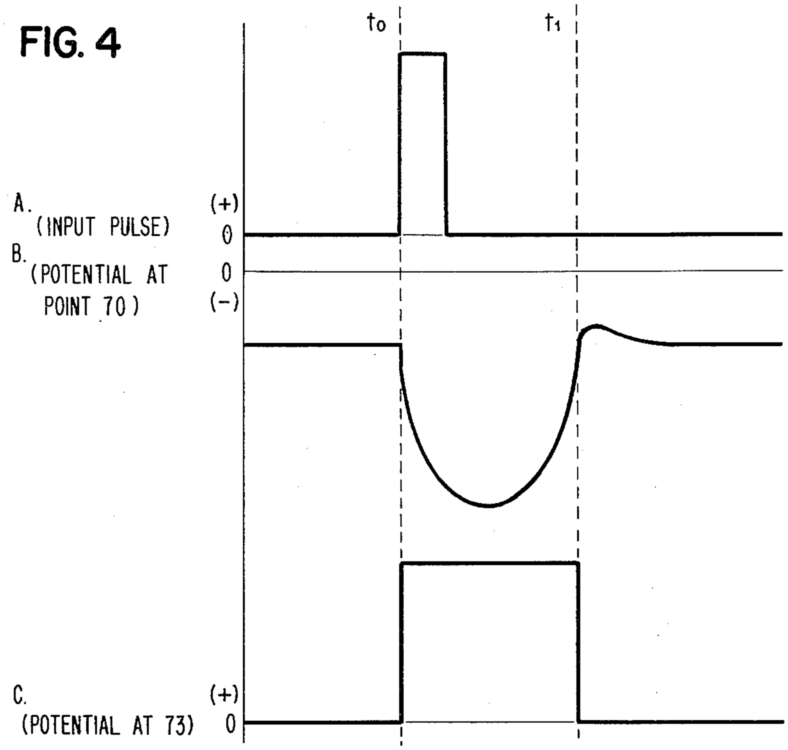
FIG. 4 is a series of waveforms to aid in explaining the operation of the circuit of FIG. 3.

Referring now to FIG. 4, curve A illustrates the shape of an input pulse that may be used to key the circuit of FIG. 4. Curve B illustrates the waveform of the potential at point 70 and curve C is the pulse available at the output line. It can be seen that these curves are similar to those of FIG. 2, except that the circuit of FIG. 3 will provide only a positive going output pulse. If transistors of opposite conductivity type are used, a negative going output pulse will be obtained.

As is apparent from the above description, the width of the output pulse in each of the two circuits is equal to a half period at the resonant frequency of its respective tuned circuit. The following table lists representative values of inductance L and capacitance C, for various pulse widths:

| L, Henries | C, Microfarads | Pulse Width (Seconds) |
|---|---|---|
| 10 | 10 | $31.4\times10^{-3}$ |
| 1.0 | 1.0 | $3.14\times10^{-3}$ |
| 0.1 | 0.1 | $314\times10^{-6}$ |
| .01 | .01 | $31.4\times10^{-6}$ |
| .001 | .001 | $3.14\times10^{-6}$ |

These values were established using a particular ratio of circuit parameters and are intended to serve merely as examples. Many other combinations of L and C are available to give other pulse widths.

The keying pulses of curve A of FIGS. 2 and 4 are shown as being considerably shorter in duration than the output pulse, as will actually be the case in most applications. As has been explained, the feedback or latch feature of this invention will maintain the circuit in its keyed condition for the full half period regardless of the length of the keying pulse. It is necessary only that the keying pulse be of sufficient duration to allow the voltage at the resonant circuit to start its negative swing and thus generate the feedback voltage. Additionally, the time period between successive keying pulses must be great enough to permit substantial damping of the circulating currents in the tuned circuit and subsequent current buildup through the inductance.

It will be appreciated that the above described circuits provide pulses of highly accurate widths. The use of precision, stable components in the resonant circuit together with the fast switching action of transistors enable the accuracy of timing to be held to close tolerances.

It is to be understood that in the illustrated embodiments NPN transistors may be substituted for PNP's and vice versa throughout the circuits with appropriate biasing changes and that this would not alter the principle or theory of operation of this invention. Similarly, the circuits shown may be adapted to use vacuum tubes, instead of transistors, without departing from the spirit of this invention.

While there have been shown and described and pointed out the fundamental novel features of the invention as applied to two preferred embodiments, it will be understood that various omissions and substitutions and changes in the form and details of the devices illustrated and in their operation may be made by those skilled in the art without departing from the spirit of the invention. It is the intention therefore, to be limited only as indicated by the scope of the following claims.

What is claimed is:

1. A single shot multivibrator comprising a first signal translating device normally in a state of high conductivity, a second signal translating device normally in a state of low conductivity, circuit means interconnecting said signal translating devices for switching said second signal translating device to a state of high conductivity in response to cessation of conduction through said first signal translating device, a resonant circuit connected to bias said first signal translating device into a non-conductive state during a portion of a first cycle of oscillation of said resonant circuit, means normally supplying charging current to said resonant circuit, and means responsive to a keying pulse input signal for abruptly discontinuing the charging current whereby said resonant circuit is excited into oscillation.

2. A single shot multivibrator comprising a first transistor normally in a state of high conductivity, a second transistor normally in a state of low conductivity, circuit means interconnecting said transistors for switching said second transistor to a state of high conductivity in response to cessation of conduction through said first transistor, a normally non-oscillating resonant circuit, means normally supplying charging current to said resonant circuit, circuit means responsive to a keying pulse for abruptly discontinuing the charging current to thereby excite said resonant circuit into oscillation, and means connecting said resonant circuit to said first transistor for interrupting the flow of current therein during a portion of the first cycle of oscillation of said resonant circuit.

3. A single shot multivibrator comprising a first transistor normally in a state of high conductivity, a second transistor normally in a state of low conductivity, circuit means interconnecting said transistors for switching said second transistor to a state of high conductivity in response to cessation of conduction through said first transistor, a normally non-oscillating resonant circuit, a third transistor normally biased to conduction connected to said resonant circuit to supply charging current thereto, means responsive to a keying pulse for rendering said third transistor non-conductive to abruptly discontinue said charging current and thereby excite said resonant circuit into oscillation, means connecting said resonant circuit to said first transistor for interrupting the flow of current therein during a portion of the first cycle of oscillation of said resonant circuit, and means connecting said second transistor to said biasing means to maintain said third transistor non-conducting during conduction of said second transistor, whereby the period of conduction of said second transistor is independent of the duration of said keying pulse.

4. A pulse generator comprising a first transistor normally in a state of high conductivity, a second transistor normally in a state of low conductivity, each of said transistors having an emitter, a collector and a base, circuit means interconnecting said transistors for switching said second transistor to a state of high conductivity in response to cessation of conduction through said first transistor, a normally non-oscillating resonant circuit, a third transistor having an emitter, a collector and a base, and normally biased to conduction, means connecting said collector of said third transistor to said resonant circuit to supply charging current thereto, biasing means responsive to a keying pulse for abruptly rendering said transistor non-conductive to thereby discontinue said charging current and excite said resonant circuit into oscillation, and means connecting said resonant circuit to the base of said first transistor to interrupt the flow of current therein during a portion of the first cycle of oscillation of said resonant circuit.

5. The pulse generator of claim 4 above, further comprising means connecting said second transistor to said biasing means to maintain said third transistor non-conducting during conduction of said second transistor, whereby the period of conduction of said second transistor is determined substantially by the duration of the said portion of said first cycle of oscillation.

6. The pulse generator as defined in claim 5 further comprising damping means connected to said resonant circuit for limiting the number of cycles of oscillation produced upon excitation.

7. A pulse generator comprising a first normally conductive transistor, a second transistor normally being biased to a first level of conduction, means interconnecting said transistors for biasing said second transistor to a second level of conduction higher than said first level in response to cessation of conduction through said first transistor, a normally non-oscillating resonant circuit, a normally operating current source connected to said resonant circuit for supplying charging current thereto, circuit means connected to said current source to render said source abruptly inoperative in response to a keying pulse, whereby charging current is discontinued and said resonant circuit is excited into oscillation, means coupling said resonant circuit to said first transistor to interrupt the flow of current therein during a portion of the first cycle of oscillation of said resonant circuit, and means coupling said second transistor to said current source to maintain said source inoperative while said second transistor is at said second level of conductivity.

8. The apparatus of claim 7 above further including a damping circuit for terminating oscillation in said resonant circuit substantially at the end of said portion of its first cycle.

9. The apparatus of claim 8 above, wherein said damping circuit comprises a portion of said first transistor.

10. A single shot multivibrator comprising a first normally conducting transistor, a second normally non-conducting transistor, each of said transistors having an emitter, a collector and a base, circuit means interconnecting said transistors for rendering said second transistor conductive in the absence of conduction through said first transistor, a normally non-oscillating resonant circuit, third, fourth and fifth transistors each having an emitter, a base and a collector, a source of current connected in common to the emitters of said third, fourth and fifth transistors, means connecting the collector of said third transistor to said resonant circuit, means normally rendering said third transistor conductive and said fourth and fifth transistors non-conductive, whereby current from said source is supplied to said resonant circuit, means responsive to a keying pulse for abruptly switching said current from said third transistor to said fourth transistor to discontinue the current supply to said resonant circuit and thereby excite it into oscillation, means coupling said resonant circuit to the base of said first transistor to interrupt the flow of current therein during a portion of the first cycle of oscillation of said resonant circuit, and means connecting said second transistor to said fifth transistor to switch said current from said fourth transistor to said fifth transistor during conduction of said second transistor, whereby the period of conduction of said second transistor is independent of the duration of said keying pulse.

11. The apparatus of claim 10 further comprising a damping circuit for terminating oscillation in said resonant circuit substantially at the end of said portion of its first cycle.

12. The apparatus of claim 11 above, wherein said damping circuit comprises a diode connected in parallel with said resonant circuit.

13. A pulse generator of the single-shot type comprising a signal translating device normally in a first state of conductivity, a resonant circuit, means for exciting said resonant circuit into oscillation, means responsive to the voltage level at a point in said resonant circuit connected to said signal translating device for causing the latter to assume a second state of conductivity during a portion of a cycle of oscillation of said resonant circuit and to return to said first state of conductivity at the termination of said portion of said cycle, and means connecting said signal translating device to said exciting means to render the latter inoperative during said portion of said cycle.

References Cited in the file of this patent

UNITED STATES PATENTS

| | | |
|---|---|---|
| 2,454,132 | Brown | Nov. 16, 1948 |
| 2,610,298 | Zaloudek | Sept. 9, 1952 |
| 2,831,126 | Linvill et al. | Apr. 15, 1958 |
| 2,851,604 | Clapper | Sept. 9, 1958 |
| 2,863,114 | Murphy | Dec. 2, 1958 |
| 2,949,547 | Zimmermann | Aug. 16, 1960 |